US006681206B1

(12) United States Patent
Gorin et al.

(10) Patent No.: US 6,681,206 B1
(45) Date of Patent: Jan. 20, 2004

(54) METHOD FOR GENERATING MORPHEMES

(75) Inventors: Allen Louis Gorin, Berkley Heights, NJ (US); Dijana Petrovska-Delacretaz, Paris (FR); Giuseppe Riccardi, Hoboken, NJ (US); Jeremy Huntley Wright, Warren, NJ (US)

(73) Assignee: AT&T Corporation, New York, NY (US)

( * ) Notice: Subject to any disclaimer, the term of this patent is extended or adjusted under 35 U.S.C. 154(b) by 610 days.

(21) Appl. No.: 09/690,903

(22) Filed: Oct. 18, 2000

Related U.S. Application Data

(60) Provisional application No. 60/163,838, filed on Nov. 5, 1999.

(51) Int. Cl.[7] ............................................. G10L 15/06
(52) U.S. Cl. ..................... 704/243; 704/245; 704/257
(58) Field of Search ................................. 704/243, 245, 704/246, 251, 257, 256; 379/88.01

(56) References Cited

U.S. PATENT DOCUMENTS

| 5,675,707 A | | 10/1997 | Gorin et al. ............ 395/2.66 |
|---|---|---|---|
| 5,794,193 A | | 8/1998 | Gorin ....................... 704/250 |
| 5,860,063 A | * | 1/1999 | Gorin et al. .............. 704/257 |
| 6,021,384 A | | 2/2000 | Gorin et al. ................. 704/1 |
| 6,044,337 A | | 3/2000 | Gorin et al. ................. 704/1 |
| 6,233,553 B1 | * | 5/2001 | Contolini et al. .......... 704/220 |
| 6,317,707 B1 | * | 11/2001 | Bangalore et al. ............. 704/9 |

* cited by examiner

*Primary Examiner*—Daniel Abebe
(74) *Attorney, Agent, or Firm*—Kenyon & Kenyon

(57) ABSTRACT

The invention concerns a method of generating morphemes for speech recognition and understanding. The method may include receiving training speech, selecting candidate sub-morphemes from the training speech, selecting salient sub-morphemes from the candidate sub-morphemes based on salience measurements, and clustering the salient sub-morphemes based on semantic and syntactic similarities into morphemes. The morphemes may be acoustic and/or non-acoustic. The sub-morphemes may represent any sub-unit of communication including phones, phone-phrases, grammars, diphones, words, gestures, tablet strokes, body movements, mouse clicks, etc. The training speech may be verbal, non-verbal, a combination of verbal and non-verbal, or multimodal.

25 Claims, 9 Drawing Sheets

| Pmax | Salient Phone Phrase |
|---|---|
| 0.84 | K ax l eh K T |
| 0.95 | K ax l eh K T K ao l |
| 0.97 | K ax l eh K T K ao l eos |
| 0.98 | m ey K ih T K ax l eh K T |
| 0.94 | K l ay K K ao l |
| 0.93 | K l ay K K ow l |
| 0.90 | P l ey s ih K l ay K |
| 0.95 | ih T K ao r T K ao l |

METHOD FOR GENERATING MORPHEMES

This non-provisional application claims the benefit of U.S. Provisional Patent Application No. 60/163,838, filed Nov. 5, 1999, which is incorporated herein by reference in its entirety.

TECHNICAL FIELD

The invention relates to automated systems for communication recognition and understanding.

BACKGROUND OF THE INVENTION

Conventional methods for constructing spoken language systems involve collecting and annotating large speech corpora for a task. This speech is manually transcribed and each utterance is then semantically labeled. The resultant database is exploited to train stochastic language models for recognition and understanding. These models are further adapted for different dialog states. Examples of such methods are shown in U.S. Pat. Nos. 5,675,707, 5,860,063 and 6,044,337, and U.S. patent application Ser. Nos. 08/943,944, filed Oct. 3, 1997, and 09/217,635, filed Dec. 21, 1998, each of which is incorporated by reference herein in its entirety.

This transcription and labeling process is a major bottleneck in new application development and refinement of existing ones. For incremental training of a deployed natural spoken dialog system, current technology would potentially require transcribing millions of transactions. This process is both time-consuming and prohibitively expensive.

SUMMARY OF THE INVENTION

The invention concerns a method of generating morphemes for speech recognition and understanding. The method may include receiving training speech, selecting candidate sub-morphemes from the training speech, selecting salient sub-morphemes from the candidate sub-morphemes based on salience measurements, and clustering the salient sub-morphemes based on semantic and syntactic similarities into morphemes.

The morphemes may be acoustic and/or non-acoustic. The sub-morphemes may represent any sub-unit of communication including phones, phone-phrases, grammars, diphones, words, gestures, tablet strokes, body movements, mouse clicks, etc. The training speech may be verbal, non-verbal, a combination of verbal and non-verbal, or multimodal.

BRIEF DESCRIPTION OF THE DRAWINGS

The invention is described in detail with reference to the following drawings wherein like numerals reference like elements, and wherein.

DETAILED DESCRIPTION OF THE PREFERRED EMBODIMENTS

Figure 1:
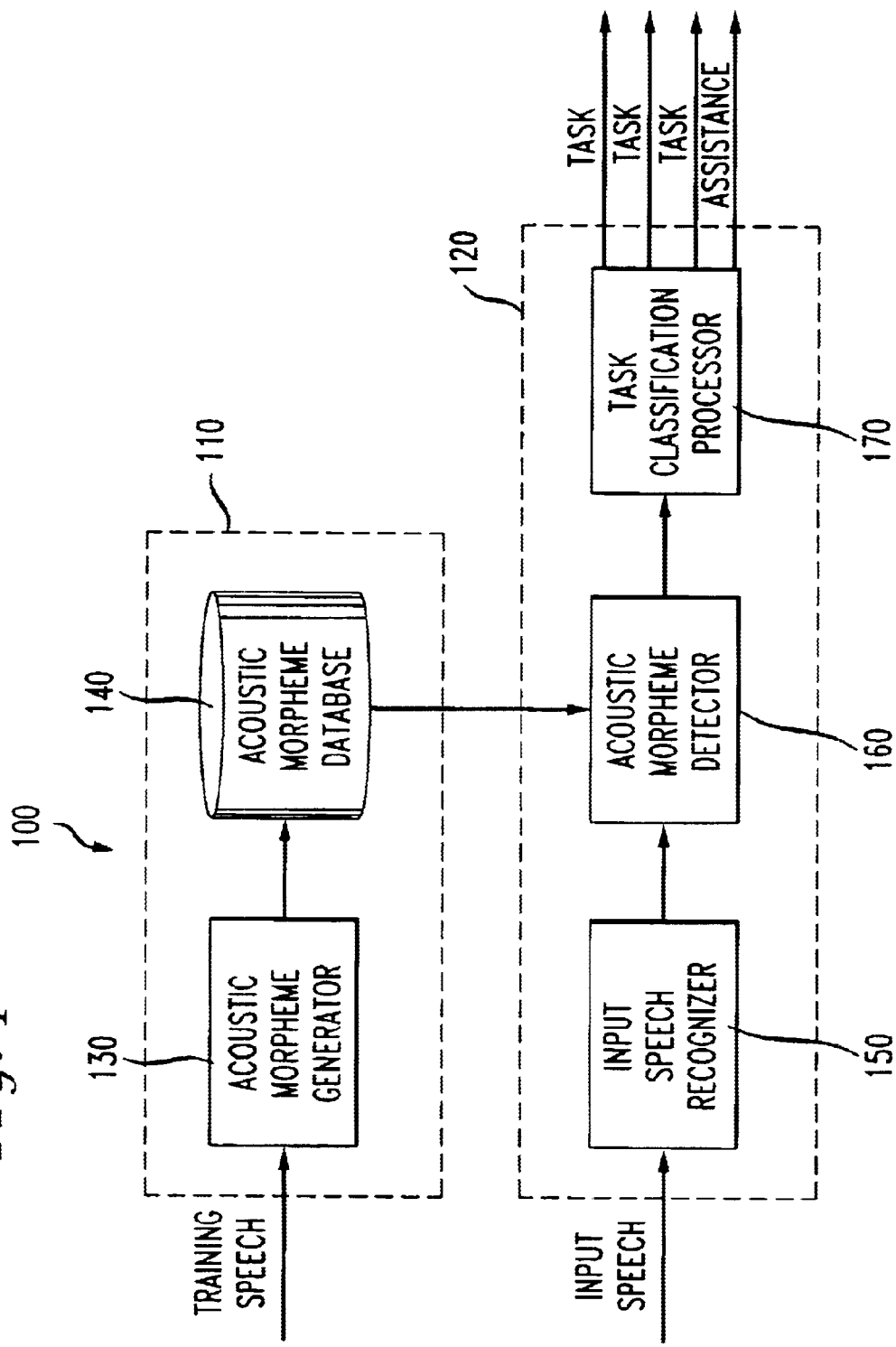
FIG. 1 is a block diagram of an exemplary speech recognition system using acoustic morphemes.

This invention concerns a spoken dialog system that automatically learns from speech without transcriptions. Semantic labels can be extracted automatically from either experiments or from autonomous dialogs. In particular, a task-independent phone-recognizer is taught how to 'learn to understand' from a database of untranscribed (or transcribed) speech plus semantic labels.

Baseline approaches to the teaching of a speech recognition systems to understand are found in U.S. Pat. Nos. 5,675,707 and 5,860,063, and U.S. patent applications Ser. Nos. 08/943,944 and 09/217,635, which are incorporated herein by reference in their entireties.

The earliest work demonstrated automatic acquisition of 'words' and 'grammar' from collapsed text. That work did not address, however, the issues arising from non-perfect recognition of speech. The next step was to show how to acquire lexical units from speech alone without transcription and exploit them for spoken language understanding (SLU). That experiment, however, was constrained to speech comprising isolated word sequences and used matching techniques to decide if an observation was a new 'word' or variation of a known 'word'.

All of the above efforts involve learning from speech alone. While one can learn much about a spoken language by merely listening to it, the process can progress further and faster by exploiting semantics. This has been demonstrated in both the engineering domain and in analyses of children's language acquisition. Thus, this invention goes beyond the past efforts by exploiting speech plus meaning using morphemes, both acoustic and non-acoustic, in order to teach a machine to 'learn to understand'.

While the morphemes may be non-acoustic (i.e., made up of non-verbal sub-morphemes such as tablet strokes, gestures, body movements, etc.), for ease of discussion, the systems and methods illustrated in the drawings and discussed in the below concern only acoustic morphemes. Consequently, the invention should not be limited to just acoustic morphemes and should encompass the utilization of any sub-units of any known or future method of communication for the purposes of recognition and understanding.

Furthermore, while the terms "speech", "phrase" and "utterance", used throughout the description below, may connote only spoken language, it is important to note in the context of this invention, "speech", "phrase" and "utterance" may include verbal and/or non-verbal sub-units (or sub-morphemes). Therefore, "speech", "phrase" and "utterance" may comprise non-verbal sub-units, verbal sub-units or a combination of verbal and non-verbal sub-units within the sprit and scope of this invention.

FIG. 1 is an exemplary block diagram of a possible speech recognition and understanding system 100 that utilizes acoustic morphemes. The speech recognition and understanding system 100 includes two related subsystems, namely an acoustic morpheme generation subsystem 110 and input speech classification subsystem 120.

The acoustic morpheme generation subsystem 110 includes an acoustic morpheme generator 130 and an acoustic morpheme database 140. The acoustic morpheme generator 130 generates acoustic morphemes from a corpus of untranscribed training speech (the invention may also operate with training speech that is transcribed, of course). The generated acoustic morphemes are stored in the acoustic morpheme database 140 for use by the acoustic morpheme detector 160. The acoustic morpheme database 140 contains a large number of verbal and non-verbal speech fragments or sub-morphemes (illustrated as phone-phrases for ease of discussion), each of which is related to one of a predetermined set of task objectives. Each of the acoustic morphemes may be labeled with its associated task objective. The operation of the acoustic morpheme generator 130 will described in greater detail with respect to FIGS. 2–4 below.

The input speech classification subsystem 120 includes an input speech recognizer 150, an acoustic morpheme detector 160 and a task classification processor 170. The input speech recognizer 150 receives a user's task objective request in the form of verbal and/or non-verbal speech. The input speech recognizer 150 may be of any known design and performs the function of recognizing, or spotting, the existence of one or more acoustic morpheme in the user's input speech.

The acoustic morpheme detector 160 then detects the acoustic morphemes present in the user's input request. The acoustic morphemes generated by the acoustic morpheme generation subsystem 110 are provided as an input to acoustic morpheme detector 160.

The output of acoustic morpheme detector 160 includes the detected acoustic morphemes appearing in the user's task objective request that is then provided to the task classification processor 170. The task classification processor 170 may apply a confidence function, based on the probabilistic relation between the recognized acoustic morphemes and selected task objectives, and makes a decision either to implement a particular task objective, or makes a determination that no decision is likely in which case the user may be defaulted to a human or automated system for assistance.

Figure 2:
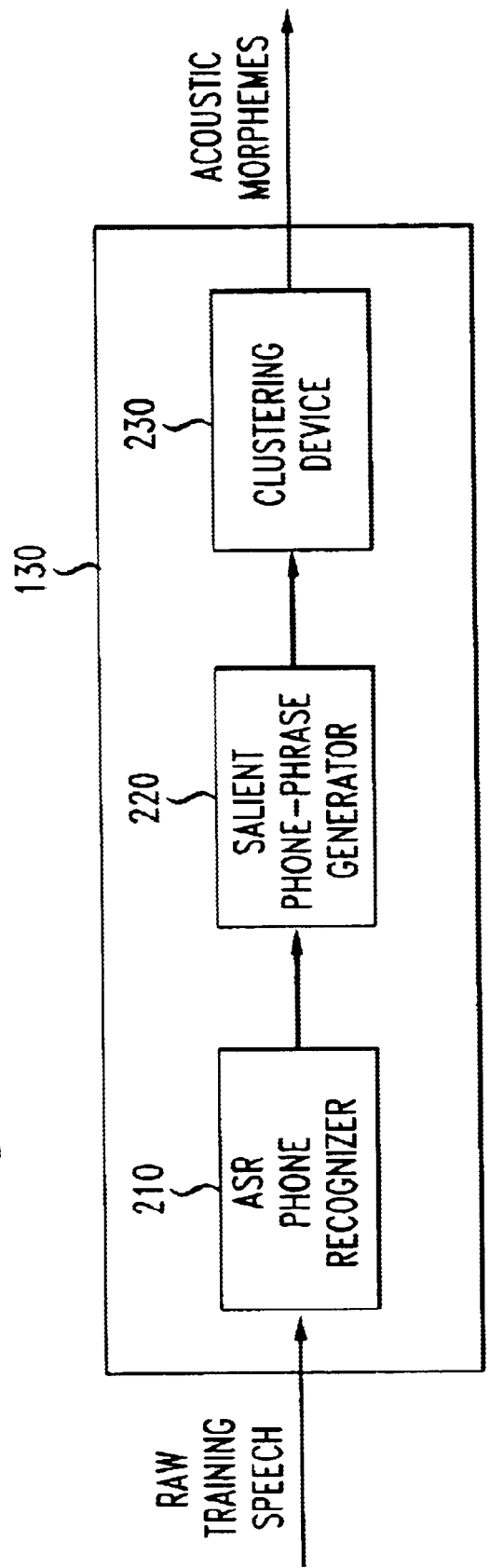
FIG. 2 is a detailed block diagram of an exemplary acoustic morpheme generator.

An exemplary process of the invention will now be described with reference to FIGS. 2–4. FIG. 2 is a detailed block diagram of an exemplary acoustic morpheme generator 130. The acoustic morpheme generator 130 includes an ASR phone recognizer 210, a salient phone-phrase generator 220 and a clustering device 230.

Figure 3:
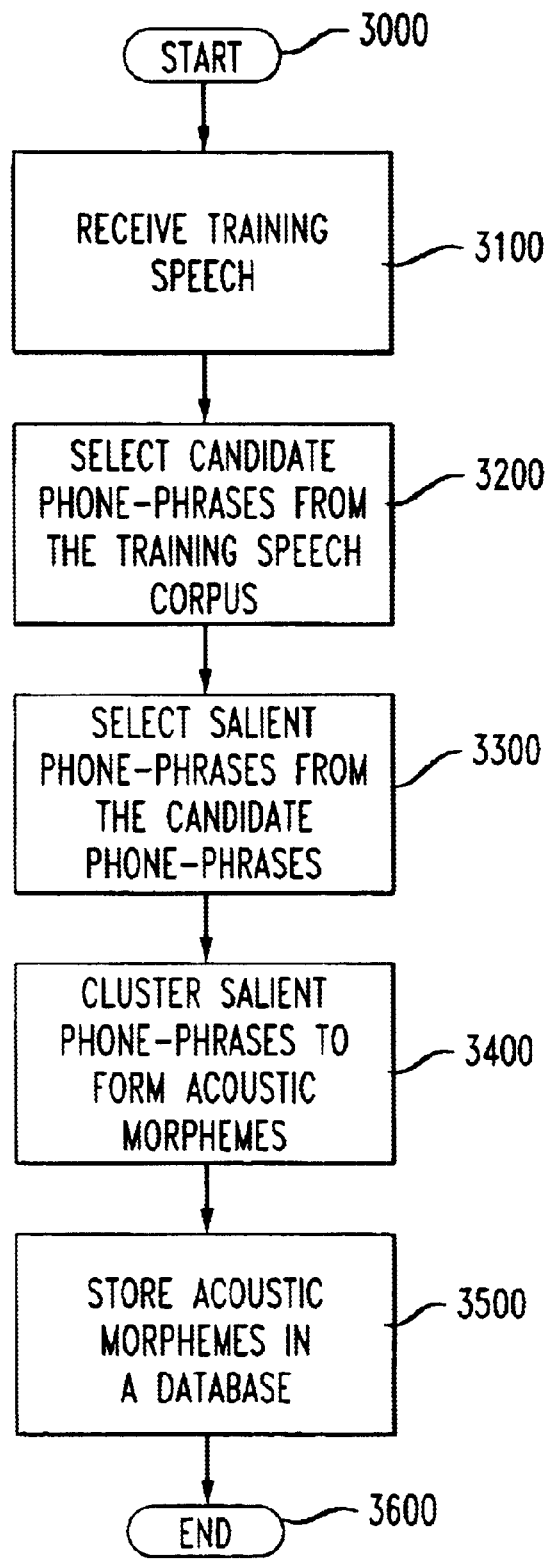
FIG. 3 is a flowchart illustrating an exemplary acoustic morpheme generation process.

FIG. 3 illustrates a possible process of generating acoustic morphemes using the acoustic morpheme of generator 130 of FIG. 2. The process begins at step 3000 and proceeds to step 3100 where the ASR phone recognizer 210 receives raw training speech from a database, for example. The database may be generated from recordings of users talking with human agents, responding to the prompt "AT&T. How may I help you?' (HMIHY). The characteristics of this data and early experiments are detailed in U.S. Pat. No. 5,675,707, for example.

In an embodiment for recognizing non-acoustic morphemes, the ASR phone recognizer 210 would be replaced in the figure by a sub-morpheme recognizer. The sub-morpheme recognizer would operate similar to the ASR phone recognizer, but it would receive raw non-acoustic or a mixture of acoustic and non-acoustic training data from a database. Again, for each of discussion, only acoustic morphemes will be discussed.

A training set of thousands of spoken utterances with corresponding call-labels is used, followed by using a separate test set in the range of 1000 utterances. We denote these HHS-train and HHS-test respectively. HHS denotes human/human speech-only.

The ASR phone recognizer 210 that is applied to the training speech is task-independent. In particular, a phonotactic language model was trained on the switchboard corpus using a Variable-Length N-gram Stochastic Automaton. This corpus is unrelated to the HMIHY task, except in that they both comprise fluent English speech. Off-the-shelf telephony acoustic models may be used. Applying the ASR phone recognizer 210 to the HMIHY test speech data yields a phone accuracy of 43%. The training and test sets so generated are denoted by ASR-phone-train and ASR-phone-test respectively.

For a baseline comparison, a 'noiseless' phonetic transcription was generated from the orthographic transcriptions, by replacing each word by its most likely dictionary pronunciation and deleting word-delimiters. E.g. "collect call" is converted to "K ax l eh K T K ao I" (see FIGS. 10 and 11, for example). We denote these data sets as transcr-phone-train and transcr-phone-test.

Figure 6:
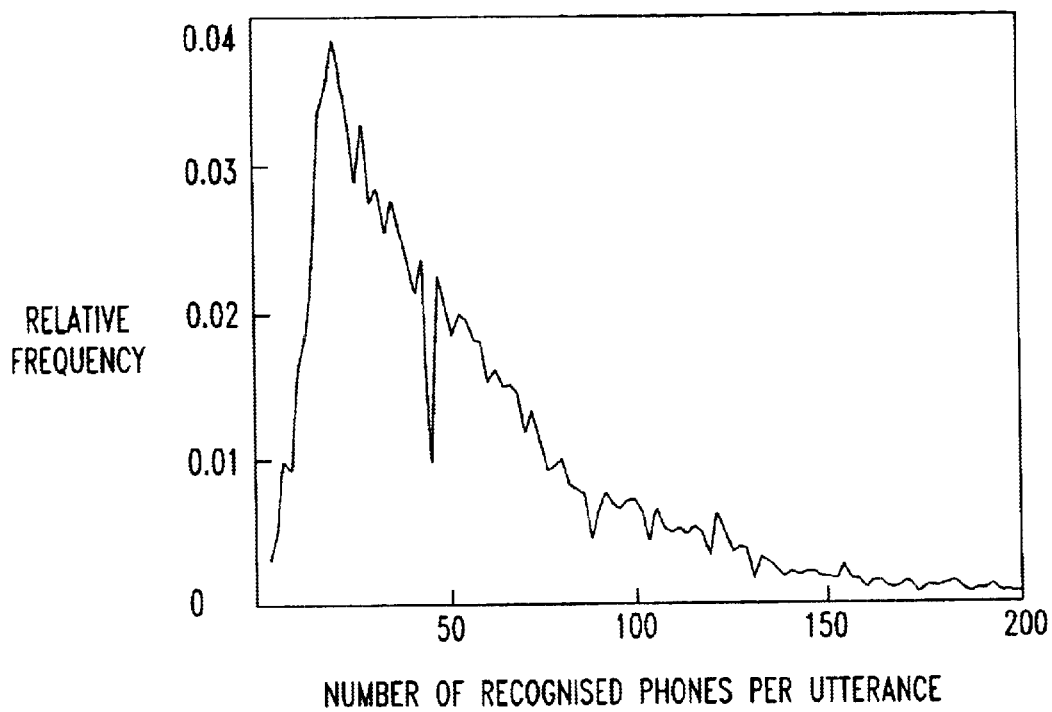
FIG. 6 is a graph illustrating the number of recognized phones per utterance.

The number of recognized phones per utterance is distributed as shown in FIG. 6. The mean length is 54 phones per utterance. The shapes of those distributions are similar, with a mean duration of 5.9 seconds.

Figure 7:
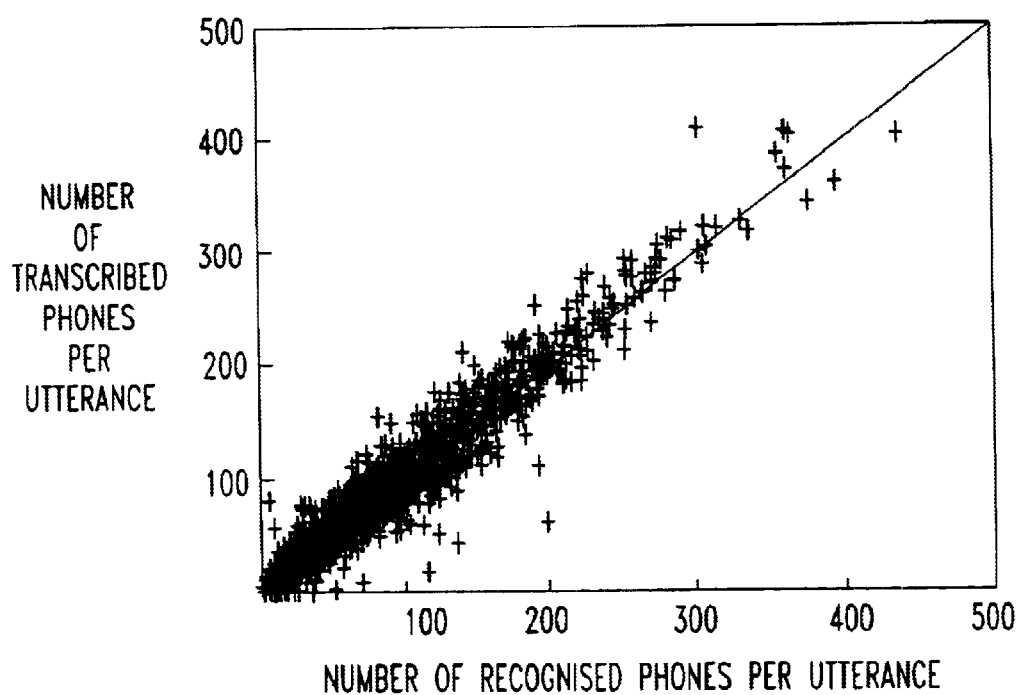
FIG. 7 is a graph illustrating the length comparison of recognized vs. transcribed utterances.

For each utterance, the length of the recognized phone sequence is compared with the length of the phonetic transcription. These values are scatter-plotted in FIG. 7, with the diagonal shown for reference. Observe that in most cases, the transcribed and recognized utterances have approximately the same length. Deviation from the diagonal is in two directions. The above-diagonal points correspond to speech being recognized as background noise or silence. The below-diagonal points correspond to background noise being recognized as speech.

In step 3200, the salient phone-phrase generator 220 selects candidate phone-phrases from the raw training speech corpus. While the system and method of the invention is illustrated and described using the term phone-phrases, it is again important to note that phone-phrases are actually sub-morphemes that may be acoustic or non-acoustic (i.e., made up of non-verbal sub-morphemes such as tablet strokes, gestures, body movements, etc.). However, as discussed above, for ease of discussion, the systems and methods illustrated in the drawings and discussed in the below concern only phone-phrases. Consequently, the invention should not be limited to using just phone-phrases and should encompass the utilization of any sub-units of any known or future method of communication for the purposes of recognition and understanding.

Figure 4:
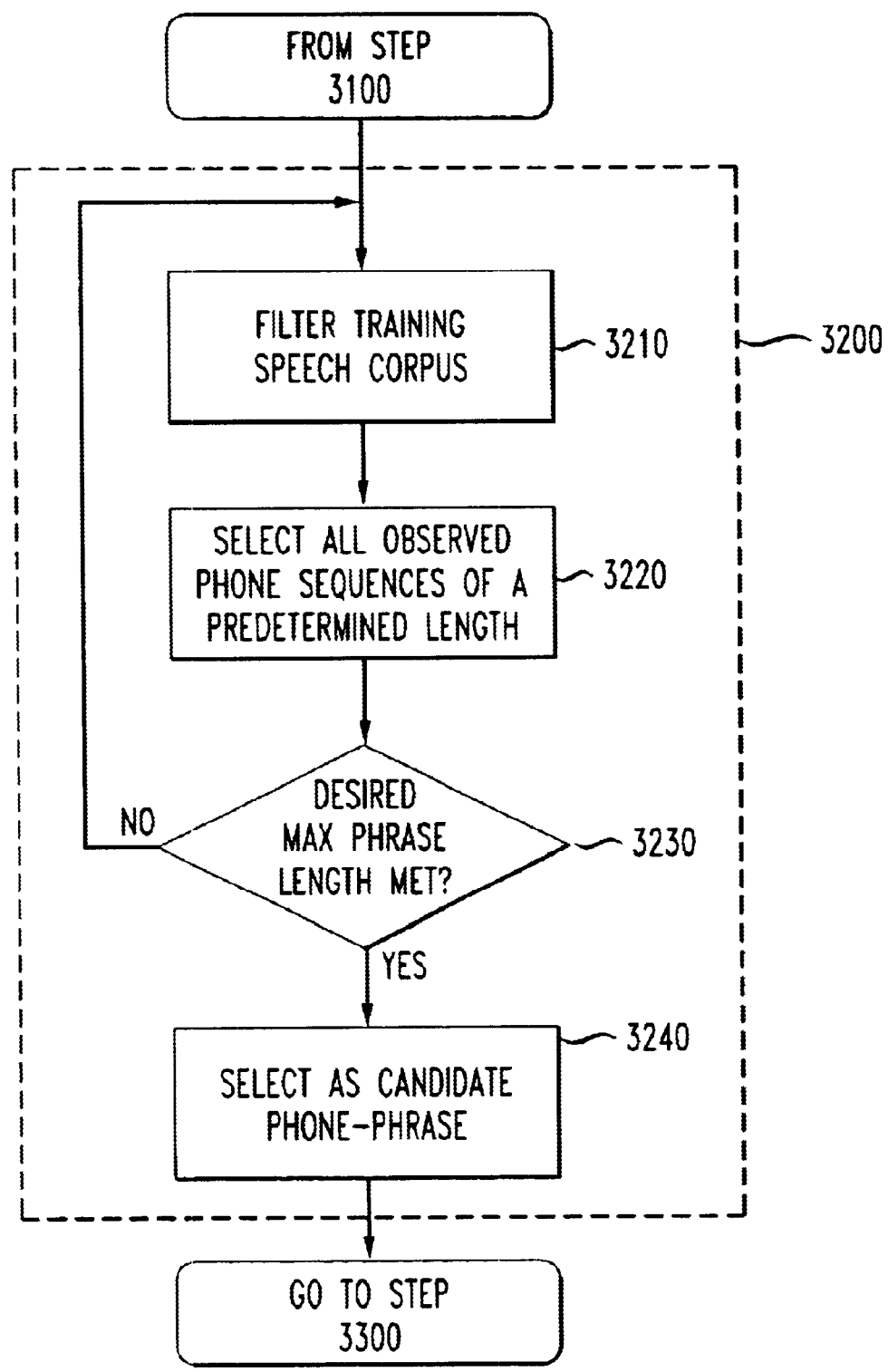
FIG. 4 is a flowchart illustrating an exemplary candidate phone-phrase selection process.

FIG. 4 illustrates a more detailed flowchart of the candidate phone-phrase selection process that takes place in step 3200. In step 3210, the raw training speech corpus is filtered using grammatical inference algorithms, such as those defined in U.S. Pat. No. 5,675,707. As a result of the filtering process, in step 3220, all observed phone sequences of the predetermined length are selected. In step 3230, he salient phone-phrase generator 220 determines whether the desired maximum phrase length has been met. If the desired maximum phrase length has been met, in step 3240, the salient phone-phrase generator 220 selects the phone sequence as a candidate phone-phrase. Conversely, if the desired maximum phrase length has not been met, the process returns to step 3210 to resume filtering the training speech corpus.

Figures 10, 11:
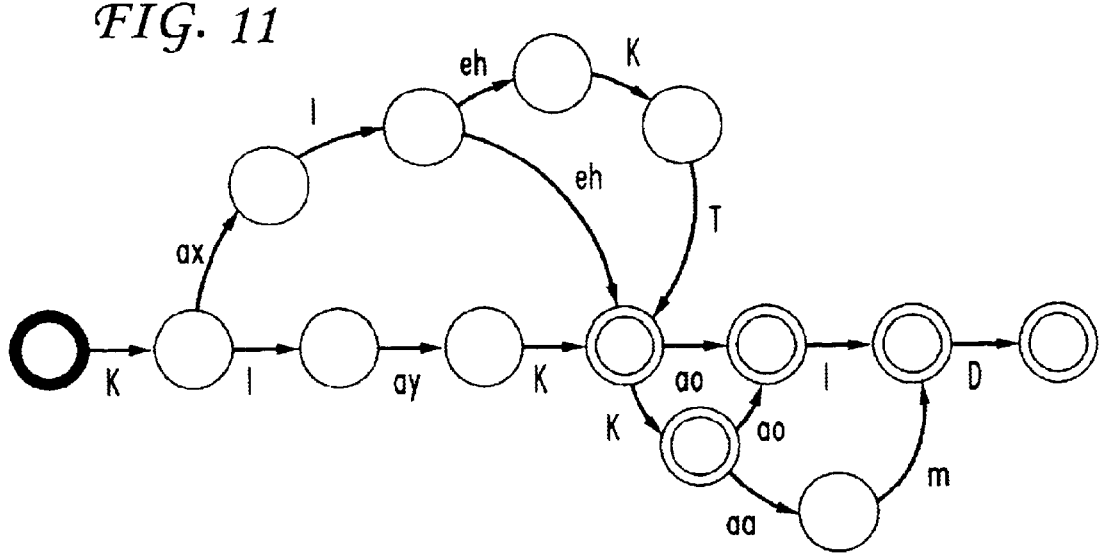
FIG. 10 illustrates examples of salient phone-phrases for "collect"
FIG. 11 illustrates an example of an acoustic morpheme for "collect"

Once the candidate phone-phrases have been selected, in step 3300, the salient phone-phrase generator 220 selects a subset of the candidate phone-phrases. Thus, new units are acquired by the above process of searching the space of observed phone-sequences and selecting a subset according to their utility for recognition and understanding. The resultant subset selected is denoted as salient phone-phrases. Examples of salient phone-phrases for the word "collect" are shown in FIG. 10.

The salient phone-phrase generator 220 may perform the selection of salient phone-phrases by first using a simplified measure of the candidate phone-phrase's salience for the task as the maximum of the a posteriori distribution, t,90 where C varies over the 15 call-types in the HMIHY task. The salient phone-phrases are then selected by applying a threshold on $P_{max}$ and by using a multinomial statistical significance test. This significance test excludes low-frequency phrases for which a fortunate conjunction of events can give a high appearance salience purely by chance. It tests the hypothesis that the observed call-type count distribution is a sample from the prior distribution.

In step 3400, the salient phone-phrases are clustered into acoustic morphemes by the clustering device 230. FIG. 11 shows examples of acoustic morphemes for the word "collect". The clustering is achieved using a combination of string and semantic distortion measures using methods, for example, such as those in U.S. patent application Ser. No. 09/217,635. Each cluster is then compactly represented as a finite state machine and stored in the acoustic morpheme database 140. The acoustic morphemes stored in the acoustic morpheme database 140 may then be used in the task classification process shown in FIG. 5.

Figure 5:
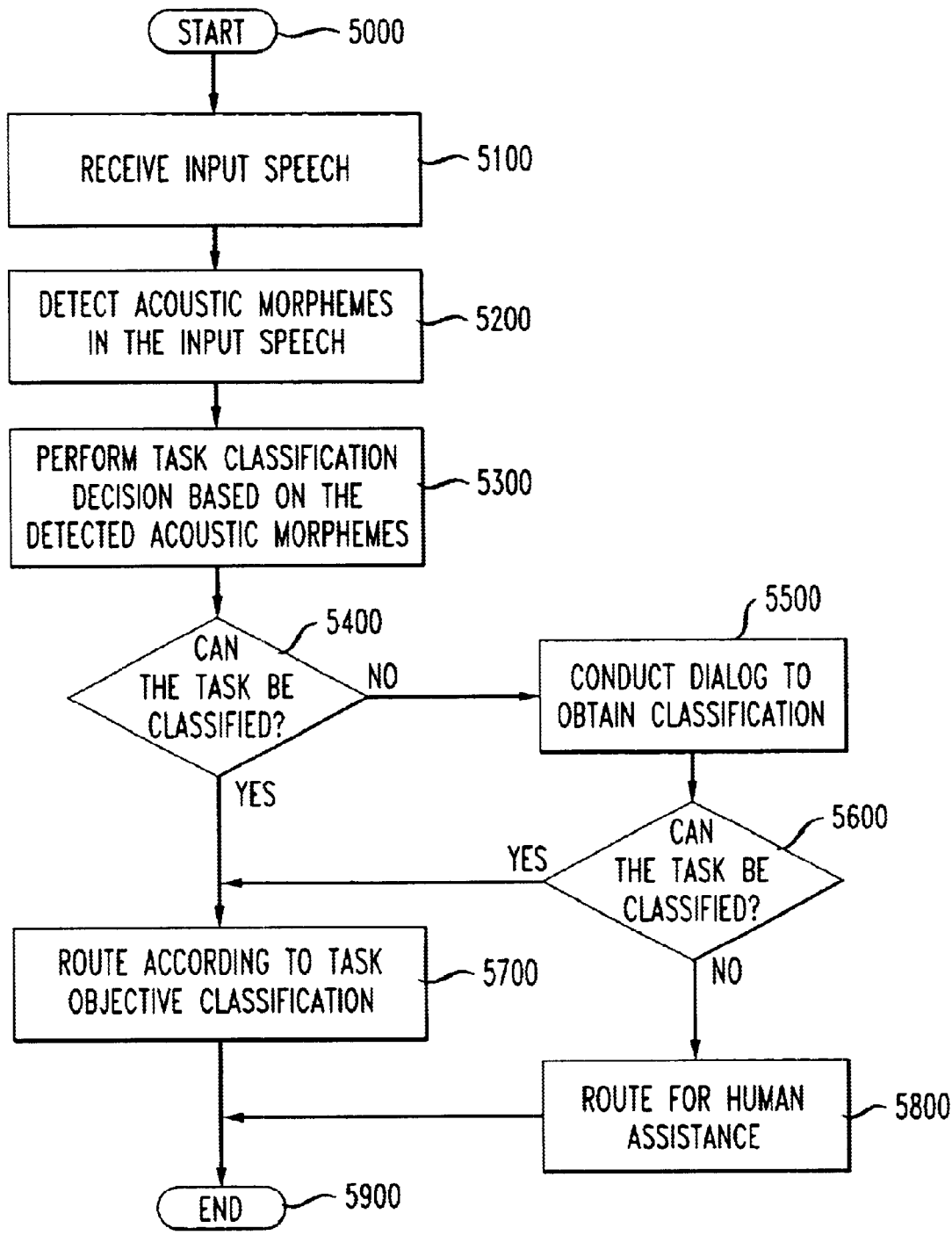
FIG. 5 is a flowchart of an exemplary speech recognition and task classification process using acoustic morphemes.

FIG. 5 is a flowchart of a possible task classification process using acoustic morphemes. The process begins at step 5000 and proceeds to step 5100 where input speech recognizer 150 receives an input communication, such as speech, from a user, customer, etc. The input speech may, of course, be expressed in verbal speech, non-verbal speech, multimodal forms, or using a mix of verbal and non-verbal speech.

Non-verbal speech may include but are not limited to gestures, body movements, head movements, non-responses, text, keyboard entries, keypad entries, mouse clicks, DTMF codes, pointers, stylus, cable set-top box entries, graphical user interface entries and touchscreen entries, or a combination thereof. Multimodal information is received using multiple channels (i.e., aural, visual, etc.). The user's input communication may also be derived from the verbal and non-verbal speech and the user's or the machine's environment. Basically, any manner of communication falls within the intended scope of the invention. However, for ease of discussion, we will focus on verbal speech in the examples and embodiments set forth below.

In step 5200, the acoustic morpheme detector 160 detects acoustic morphemes that have been recognized by the input speech recognizer 150 using the acoustic morphemes stored in the acoustic morpheme database 140. In step 5300, the task classification processor 170 performs task classifications based on the detected acoustic morphemes. The task classification processor 170 may apply a confidence function based on the probabilistic relation between the recognized acoustic morphemes and selected task objectives, for example. In step 5400, the task classification processor 170 determines whether a task can be classified based on the detected acoustic morpheme. If the task can be classified, in step 5700, the task classification processor 170 routes the user/customer according to the classified task objective. The process then goes to step 5900 and ends.

If the task cannot be classified in step 5400 (i.e. a low confidence level has been generated), in step 5500, a dialog module (located internally or externally) the task classification process or 170 conducts dialog with the user/customer to obtain clarification of the task objective. After dialog has been conducted with the user/customer, in step 5600, the task classification processor 170 determines whether the task can now be classified based on the additional dialog. If the task can be classified, the process proceeds to step 5700 and the user/customer is routed in accordance with the classified task objective and the process ends at step 5900. However, if task can still not be classified, in step 5800, the user/customer is routed to a human for assistance and then the process goes to step 5900 and ends.

The example below illustrates this acoustic morpheme generation process. Consider a candidate phone-phrase, $$f = p_1 p_2 \ldots p_n,$$

where $p_i$ are phones. Denote its frequency by F(f). A measure of its utility for recognition is the mutual information of its components, denoted MI(f), which may be approximated via $$MI(f) = MI(p_1 p_2 \ldots p_{n-1}; p_n).$$

As discussed above, a simplified measure of its salience for the task is the maximum of the a posteriori distribution, $$P_{\max}(f) = \max_c Pr(C|f),$$

where C varies over the 15 call-types in the HMIHY task.

Figure 8:
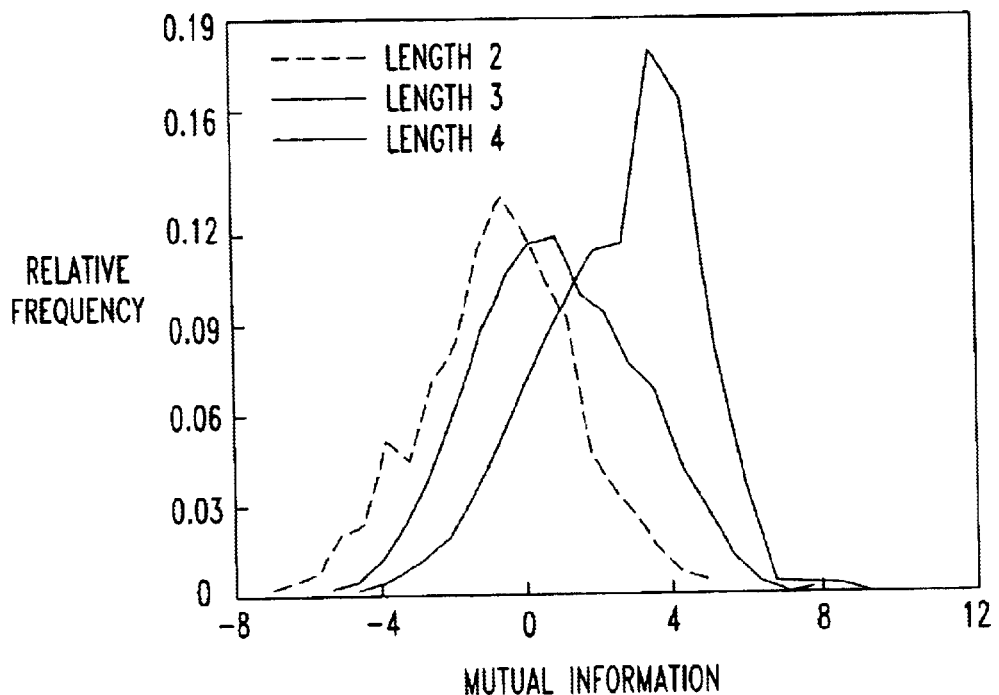
FIG. 8 is a graph illustrating the mutual information (MI) of phone-phrases, showing increased MI as their length increases.

These features for phone-phrases observed in the noise-free case are characterized transcr-phone-train. In FIG. 8, the MI distributions of these phone-phrases are shown for lengths 2–4. It can be observed that the MI distributions shift positively as length increases, corroborating the increased predictive power of longer units. It can also be observed, however, that while many of these phrases have positive predictive power (MI>0), many do not. Thus, for constructing larger units from smaller ones, attention is restricted to the positive tail of these MI distributions.

Figure 9:
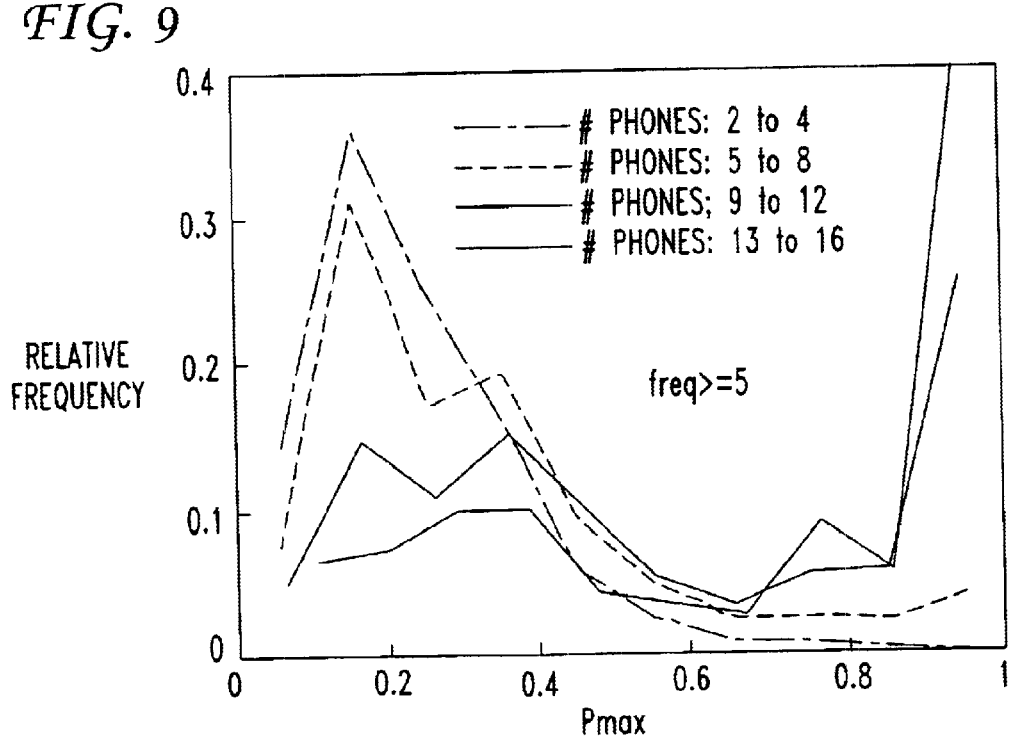
FIG. 9 is a graph illustrating the $P_{max}$ of phone-phrases, showing more phrases with high $P_{max}$ as their length increases.

For each of these phone-phrases, $P_{max}(f)$ is computed, which measures the salience of a phrase for the task. FIG. 9 shows the distribution of $P_{max}$ for varying length phrases. It can be observed that for single phones, $P_{max}$ is near-random, corroborating the intuition that semantics is carried by longer phone-phrases. It can also be observed that the positive shift in the distributions as length increases. In particular, focus on the region $P_{max}$>0.9, which corresponds to highly salient phone-phrases. As length increases, more of these highly salient phrases are discovered.

The goal of this process is to grow the phone-phrases until they have the salience of words and word-phrases. Thus, the search criteria for selecting longer units is a combination of their utility for within-language prediction, as measured by MI, and their utility for the task, as measured by $P_{max}$. For phrases with large $P_{max}$, the MI of the phrase tends to be larger than average. This correlation was exploited successfully for frequency-compensated salience in earlier experiments discussed above, but is not exploited here. In the earlier experiments, a set of salient phone-phrases of length≦16 was generated via a two-pass process as follows:

Select phone-phrases with $F(f) \geq 5$ and length≦4;
 Filter the training corpus ASR-phone-train with those phrases, using a left-right top-down filter with the phrases prioritized by length.
 Select subsequences from the filtered corpus of fragment-length≦4, (i.e. with #phones≦16) and with $MI \geq 1$ and $P_{max} \geq 0.5$.

Figure 12:
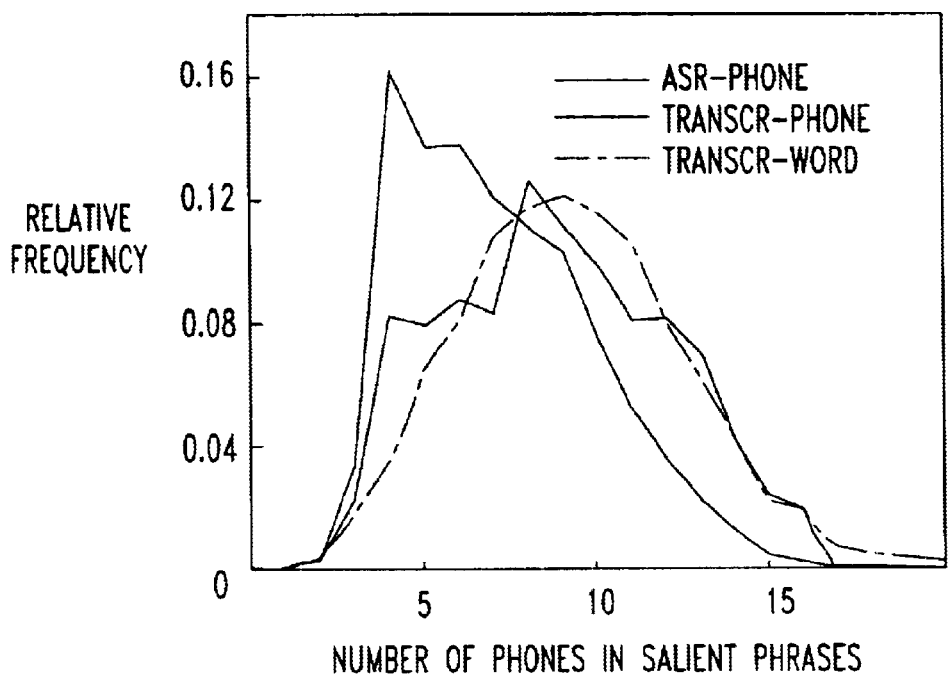
FIG. 12 is a graph illustrating the length of salient phone-phrases.

This particular iterative selection process was selected based on ease of implementation should not be considered optimal. The resultant set of salient phone-phrases have lengths≦16, distributed as shown in FIG. 12.

An experiment evaluating the utility of these methods in the HMIHY task was conducted. A classifier was trained from the output of a phone recognizer on 7462 utterances, which was denoted ASR-phone-train. Salient phone-phrases of length≦16 were selected, as described above. The salient phone-phrases were then clustered into salient grammar fragments. A single-layer neural net was trained with these fragments as input features. The resultant classifier was applied to the 1000 utterance test-set, ASR-phone-test.

The call-classification results are scored following the methodology of U.S. Pat. No. 5,675,707. In this method, an utterance is classified by the system as one of 15 call-types or rejected as 'other'. Rejection is based on a salience-threshold for the resulting classification. One dimension of performance is the False Rejection Rate (FRR), which is the probability that an utterance is rejected in the case that the user wanted one of the call-types. The cost of such an error is a lost opportunity for automation. The second dimension of performance is the Probability of Correct Classification ($P_c$) when the machine attempts a decision. The cost of such an error is that of recovery via dialog. Varying the rejection threshold traces a performance curve with axes $P_c$ and FRR.

Figure 13:
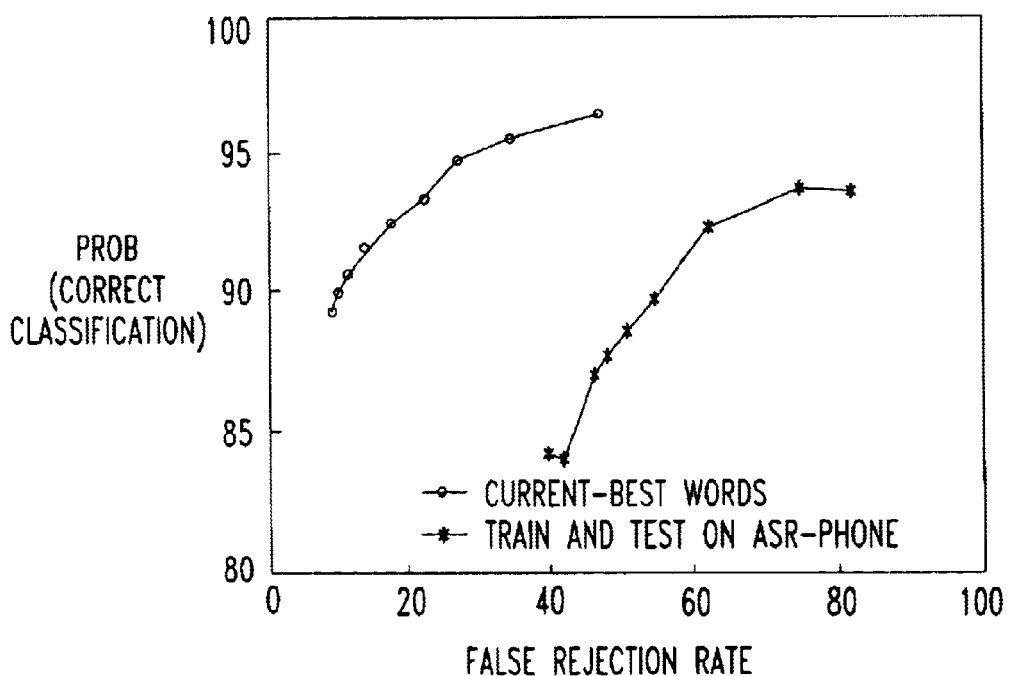
FIG. 13 is a graph illustrating the experimental call-classification performance on speech using acoustic morphemes.

FIG. 13 shows the results of two experiments evaluated on the 1K test set ASR-phone-test. The first experiment uses acoustic-morphemes trained from speech via ASR-phone-train. There is a remarkably high Probability Correct for those utterances which are classified ($\geq 90\%$), albeit with a relatively high False Rejection Rate. The second experiment was trained on text, transcr-phone-train and evaluated on speech ASR-phone-test. Interestingly, it is significantly worse than training on speech. This corroborates the intuition that when classifying 'noisy' data, it is better to train in matched conditions. Call-classification operating curves for this task which were trained on word-transcriptions, exploiting sophisticated language models for ASR and SLU with utterance verification are also shown for comparison purposes.

As shown in FIGS. 1 and 2, the method of this invention may be implemented using a programmed processor. However, method can also be implemented on a general-purpose or a special purpose computer, a programmed microprocessor or microcontroller, peripheral integrated circuit elements, an application-specific integrated circuit (ASIC) or other integrated circuits, hardware/electronic logic circuits, such as a discrete element circuit, a programmable logic device, such as a PLD, PLA, FPGA, or PAL, or the like. In general, any device on which the finite state machine capable of implementing the flowcharts shown in FIGS. 3–5 can be used to implement the speech recognition and understanding system functions of this invention.

While the invention has been described with reference to the above embodiments, it is to be understood that these embodiments are purely exemplary in nature. Thus, the invention is not restricted to the particular forms shown in the foregoing embodiments. Various modifications and alterations can be made thereto without departing from the spirit and scope of the invention.

What is claimed is:

1. A method of generating acoustic morphemes, comprising:
 receiving training speech;
 selecting candidate phone-phrases from the training speech;
 selecting salient phone-phrases from the candidate phone-phrases based on salience measurements;
 clustering the salient phone-phrases based on semantic and syntactic similarities into acoustic morphemes.

2. The method of claim 1, further comprising:
 storing the acoustic morphemes in a database.

3. The method of claim 2, wherein the acoustic morpheme database is used by a speech recognition and understanding system.

4. The method of claim 1, wherein the step of selecting candidate phone-phrases includes:
 filtering the training speech;
 selecting all observed phone sequences of a predetermined length; and
 selecting as candidate phone-phrases the phone sequences that are of at least the predetermined length.

5. The method of claim 1, wherein the training speech includes at least one of verbal and non-verbal speech.

6. The method of claim 5, wherein the non-verbal speech includes the use of at least one of gestures, body movements, head movements, non-responses, text, keyboard entries, keypad entries, mouse clicks, DTMF codes, pointers, stylus, cable set-top box entries, graphical user interface entries and touchscreen entries.

7. The method of claim 1, wherein the training speech includes multimodal forms.

8. The method of claim 1, wherein the training speech is untranscribed.

9. The method of claim 1, wherein the training speech is transcribed.

10. The method of claim 1, wherein the salient phone-phrases are selected using a test for significance.

11. The method of claim 1, wherein the salient phone-phrases are clustered into acoustic morphemes using a distortion measure between the salient phone-phrases.

12. The method of claim 11, wherein the distortion measure is based on at least one of string distortion, semantic distortion and syntactic distortion.

13. A method of generating morphemes, comprising:
 receiving training speech;
 selecting candidate sub-morphemes from the training speech;
 selecting salient sub-morphemes from the candidate sub-morphemes based on salience measurements;
 clustering the salient sub-morphemes based on semantic and syntactic similarities into morphemes.

14. The method of claim 13, wherein the morphemes are at least one of acoustic and non-acoustic.

15. The method of claim 13, further comprising:
 storing the morphemes in a database.

16. The method of claim 15, wherein the morpheme database is used by a speech recognition and understanding system.

17. The method of claim 13, wherein the step of selecting candidate sub-morphemes includes:

filtering the training speech;

selecting all observed sub-morpheme sequences of a predetermined length; and selecting as candidate sub-morphemes the sub-morpheme sequences that are of at least the predetermined length.

18. The method of claim 13, wherein the training speech includes at least one of verbal and non-verbal speech.

19. The method of claim 18, wherein the non-verbal speech includes the use of at least one of gestures, body movements, head movements, non-responses, text, keyboard entries, keypad entries, mouse clicks, DTMF codes, pointers, stylus, cable set-top box entries, graphical user interface entries and touchscreen entries.

20. The method of claim 13, wherein the training speech includes multimodal forms.

21. The method of claim 13, wherein the training speech is untranscribed.

22. The method of claim 13, wherein the training speech is transcribed.

23. The method of claim 13, wherein the salient sub-morphemes are selected using a test for significance.

24. The method of claim 13, wherein the salient sub-morphemes are clustered into morphemes using a distortion measure between the salient sub-morphemes.

25. The method of claim 24, wherein the distortion measure is based on at least one of string distortion, semantic distortion and syntactic distortion.

* * * * *